United States Patent [19]
Kaba

[11] Patent Number: 5,790,810
[45] Date of Patent: Aug. 4, 1998

[54] INPUT/OUTPUT UNIT FOR A PROCESSOR OF A COMPUTER SYSTEM HAVING PARTITIONED FUNCTIONAL ELEMENTS THAT ARE SELECTIVELY DISABLED

[75] Inventor: James Timothy Kaba, Jackson, N.J.

[73] Assignee: David Sarnoff Research Center Inc., Princeton, N.J.

[21] Appl. No.: 731,491

[22] Filed: Oct. 16, 1996

[51] Int. Cl.⁶ .................................................. G06F 13/00
[52] U.S. Cl. .................. 395/284; 395/653; 395/800.13; 395/750.06
[58] Field of Search .................. 395/750.01, 750.06, 395/750.08, 200.51, 653, 800.13, 182.03, 284, 800.15, 856

[56] References Cited

U.S. PATENT DOCUMENTS

| | | | |
|---|---|---|---|
| 3,810,120 | 5/1974 | Huettner et al. | 395/182.03 |
| 4,608,631 | 8/1986 | Stiffler et al. | 395/293 |
| 4,747,041 | 5/1988 | Engel et al. | 395/750.06 |
| 5,175,865 | 12/1992 | Hillis | 395/800 |
| 5,255,376 | 10/1993 | Frank | 395/285 |
| 5,408,668 | 4/1995 | Tornai | 395/750.06 |

*Primary Examiner*—Gopal C. Ray
*Attorney, Agent, or Firm*—William J. Burke

[57] ABSTRACT

In a computer system containing at least one processor subsystems, an apparatus and a method for selective disabling processor subsystems using functional segmentation of the input/output circuitry. Each processor subsystem has a processor unit that is connected to an input/output unit. The input/output unit is partitioned into functional elements which are connected to other input/output units of other processor subsystems in the plurality of processor subsystems or to data sources and data sinks. The I/O unit further contains a functional element controller for selectively disabling and enabling the functional elements.

19 Claims, 2 Drawing Sheets

5,790,810

1

INPUT/OUTPUT UNIT FOR A PROCESSOR OF A COMPUTER SYSTEM HAVING PARTITIONED FUNCTIONAL ELEMENTS THAT ARE SELECTIVELY DISABLED

The invention relates to a computer system. More particularly, the invention relates to a system for independent and selective control of one or more processors in a computer using functional segmentation of the input/output circuitry associated with each processor.

BACKGROUND OF THE INVENTION

An example of a parallel processing computer is disclosed in commonly assigned U.S. Pat. No. 5,671,377, issued Sep. 23, 1997 and U.S. Pat. No. 5,581,778, issued Dec. 3, 1996 both of which are incorporated herein by reference. Another example of a parallel processing computer is disclosed in U.S. Pat. No. 5,175,865, issued Dec. 29, 1992. Such computers typically contain at least one controller and, associated with each controller, a plurality of processor subsystems. Each processor subsystem is coupled to input/output (I/O) circuitry. The I/O circuitry provides data distribution functionality that transfers data to and from the various processor subsystems and computer peripherals.

Parallel processing computers tend to have an architecture that disables an entire processor subsystem when a particular processor is chosen to be bypassed, e.g., when a particular processor is not needed for a specific computation or when a particular processor is inoperative. By disabling the entire processor subsystem, the I/O circuitry associated with the disabled subsystem is also disabled. Thus, the I/O circuitry of a particular processor subsystem is not used when that processor subsystem is disabled.

Therefore, a need exists in the art for an apparatus that permits selective deactivation and activation of elements of the I/O circuitry while an associated processor is bypassed or disabled.

SUMMARY OF THE INVENTION

The invention overcomes the disadvantages heretofore associated with prior art parallel processing computers. Specifically, the invention contains segmented I/O circuitry, where the segmentation is provided with regard to function of the various components of the I/O circuitry. In particular, the I/O circuitry is divided into input and output elements, where each element can be selectively activated and deactivated. Other elements include a peripheral interface and an interprocessor communications interface. Any one, all or a combination of the elements are selected for activation by an element selector. The element selector is responsive to instructions that are communicated to the element selector from either a controller or a processor within the parallel processing computer. Such segmented I/O circuitry finds application in single processor computer systems as well as parallel processing computer systems.

BRIEF DESCRIPTION OF THE DRAWINGS

The teachings of the present invention can be readily understood by considering the following detailed description in conjunction with the accompanying drawings, in which.

2

Figure 1:
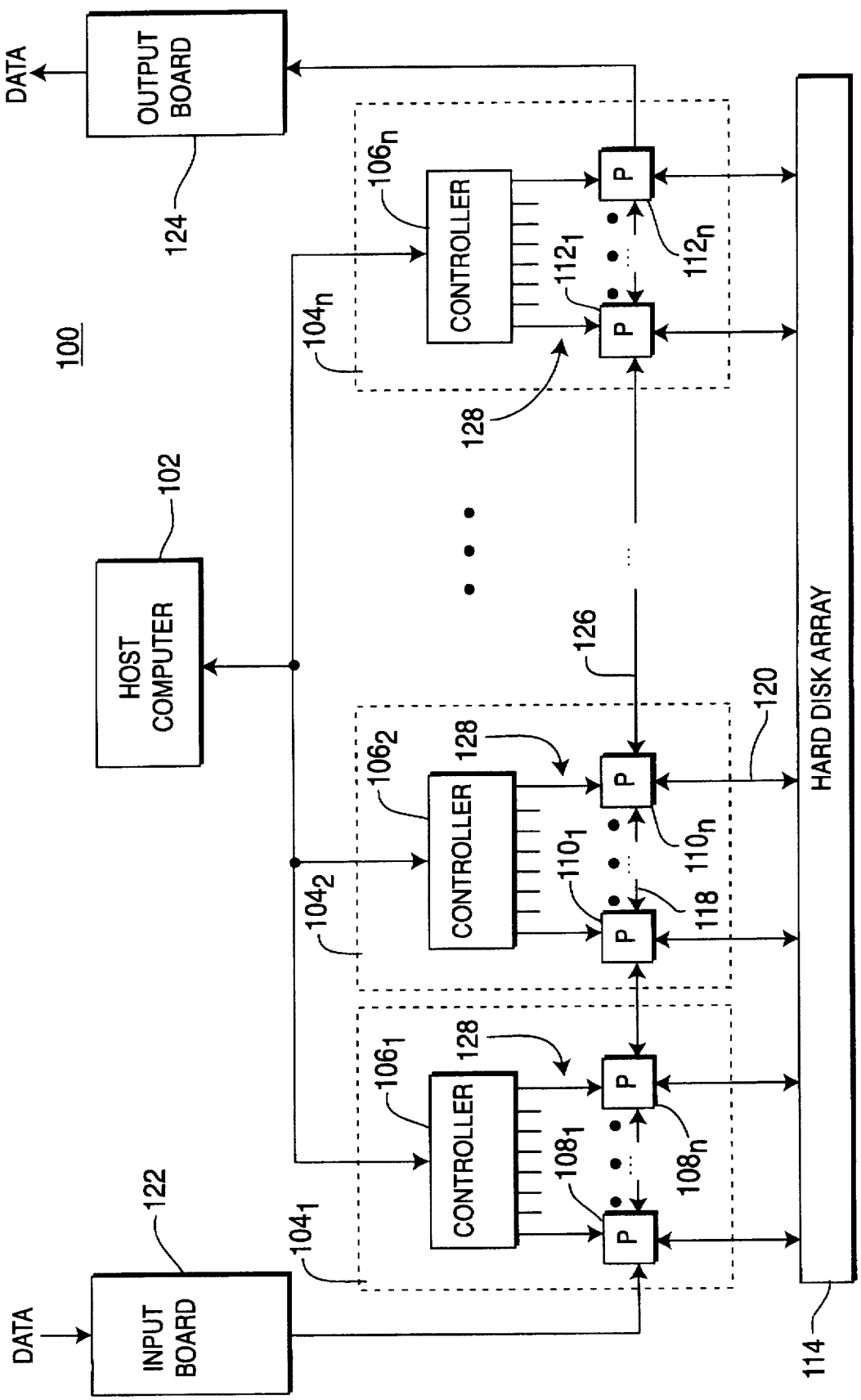
FIG. 1 depicts a high-level block diagram of a parallel processing computer that contains the present invention.

To facilitate understanding, identical reference numerals have been used, where possible, to designate identical elements that are common to the figures.

DETAILED DESCRIPTION

FIG. 1 depicts a high level block diagram of a parallel processing computer 100 incorporating the present invention. The computer 100 contains a host computer 102, controller subsystems $104_n$ (where n is an integer greater than or equal to 1), a hard disk drive array 114, and input 122 and output 124 boards. Additionally, the controller subsystems $104_n$ each contain a controller $106_n$ and a plurality of processor subsystems $108_n$, $110_n$, $112_n$ associated with the controller. Each controller $106_n$ communicates with its associated processor subsystem $108_n$ via a plurality of instruction buses 128. Specifically, a parallel processing computer having this configuration, known as the Sarnoff Engine, has been designed by the David Sarnoff Research Center of Princeton, N.J. The Sarnoff Engine is disclosed in a commonly assigned U.S. Pat. No. 5,581,778, issued Dec. 3, 1996. These applications are hereby incorporated by reference.

The Sarnoff Engine is a practical example of the type of parallel processing computer that would utilize the invention. In the Sarnoff Engine, there are 64 processor subsystems, e.g., processor subsystems $108_1$ through $108_{64}$ connected to each controller, e.g., $106_1$. Physically, a controller and its 64 processor subsystems are mounted on a single circuit card. The circuit cards are illustrated as dashed boxes $104_n$. Each card has 16 processor integrated circuits each containing four processors. Each of the four processors is associated with various processor support circuitry (e.g., memory instruction logic, timing synchronization logic, input/output circuitry and the like) to produce four processor subsystems on each integrated circuit. The circuit cards are connected to one another via the host computer 102. The host computer functions as a main controller that monitors and controls the operation of the various controllers and processor subsystems within the parallel processing computer. In addition to the host computer, the circuit cards are also connected to one another by a data communications bus 126 that facilitates data exchange amongst the processors. Such a computer architecture is easily expanded to increase the computing power of the engine by adding additional circuit cards to the system. Thus, the Sarnoff Engine is said to be scalable.

Although the hard disk drive array 114 is depicted as a single and separate unit from the processor subsystem 108, 110, and 112, the hard disk drive array 114 is depicted in this manner as an example of a mass storage device architecture that could be used as part of the system. Furthermore, the array can have one disk drive connected to each processor, a subarray connected to each processor or a single array of disks connected to all the processors through an array interface.

Additionally, the input board 122 supplies a data stream to the processor subsystems. To distribute the stream for processing or storage, the stream is passed from processor to processor using the data communications bus 126. Similarly, data is output from the system by passing the data along the data communications bus 126 to the output board 124.

Figure 2:
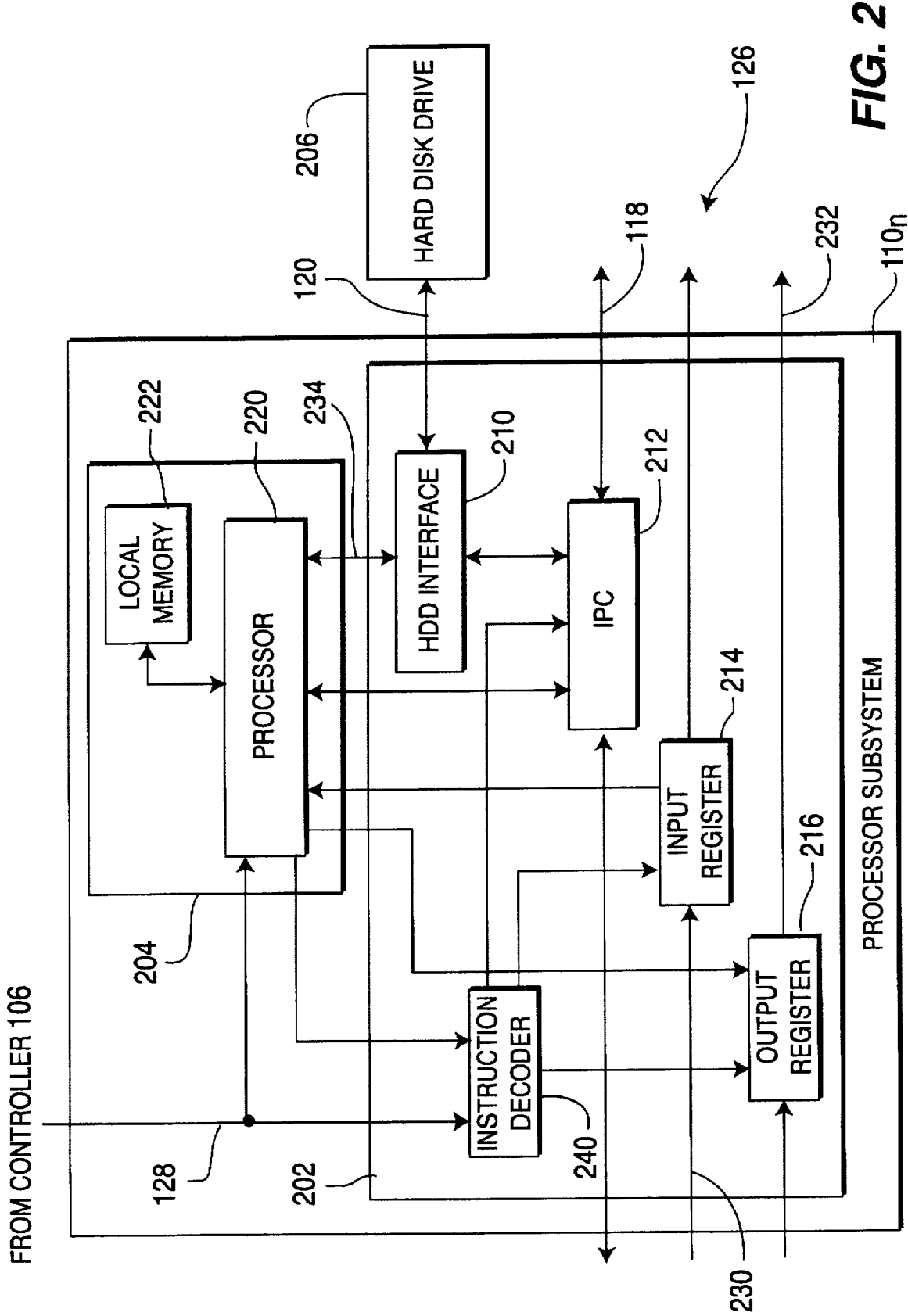
FIG. 2 depicts a block diagram of a processor subsystem within a parallel processing computer shown in FIG. 1.

FIG. 2 is a block diagram of a processor subsystem $110_n$ within the parallel processing computer of FIG. 1. The processor subsystem $110_n$ contains a processor unit 204 and an input/output (I/O) unit 202. The processor unit 220 receives instructions from the controller via instruction bus 128. Additionally, a hard disk drive 206 is connected to the processor subsystem through the I/O unit 202. This arrangement of a single hard disk drive connected to the processor subsystem is an example of one configuration illustrating the interface to a storage array (e.g., an illustrative computer peripheral device).

The processor unit 204 contains a processor 220 with a direct link to an associated local memory 222, e.g., random access memory (RAM).

The I/O unit 202 is partitioned into a plurality functional elements 210, 212, 214 and 216. In the preferred embodiment, the I/O unit is partitioned into a hard disk drive (HDD) interface 210, an interprocessor communication (IPC) interface 212, an input register 214 and an output register 216. Of course, other variations of functional segmentation can be arranged in the I/O unit, i.e., adding, replacing or omitting one or more of these functional elements as well as others.

The processor 220 is connected directly to each of the individual functional elements 212, 214, 216 of the I/O unit. Further, the processor is linked to other processor subsystems through these functional elements, e.g., the interconnection of these elements forms the data communications bus 126. Furthermore, the I/O unit contains an instruction decoder 240 for selectively disabling and enabling each functional element. Thus, when a functional element is disabled, the processor unit no longer communicates through the disabled functional element. In the immediate design, all functional elements, except the HDD interface 210, are connected directly to the processor 220. The HDD interface 210 is connected to the IPC interface 212. Thus, the processor 220, as well as any other processors in the computer, can retrieve or transmit information to the hard disk drive 206 by way of the IPC interface 212 and the HDD interface 210. Alternatively, the HDD interface 210 can be connected directly to the processor 220 as indicated by dashed path 234.

As discussed above, each processor subsystem 110 in the array of processor subsystems is connected to one another through a data communications bus 126. The data communications bus comprises a plurality of buses that interconnect the functional segments in neighboring processor subsystems. Specifically, each IPC interface is connected to at least one neighboring IPC interface by an IPC bus 118. The input register 214 is connected to at least one neighboring input register by an input bus 230. Similarly, an output bus 232 connects the output register 216 to at least one neighboring output registers.

In this configuration, each processor is linked to other processors through their associated functional I/O elements. Individual processors can be bypassed in the array of processor subsystems by disabling various ones of these elements. The means for disabling functional segments is the instruction decoder 240 which operates as a functional element selector. The instruction decoder is provided particular control instructions from either the controller or the processor unit. Note that the processor unit may perform a particular computation that results in an instruction to disable a certain I/O element.

When a particular instruction occurs from either instruction source, the decoder asserts one or more output lines, i.e., a write enable bit. This bit is passed to the specific functional element identified by the instruction. The selected functional element receives this write enable bit which disables the element, e.g., the element can no longer have data written into its register(s). In this manner, other functional elements (e.g., those not selected by the instruction) continue to function and the processor unit 204 continues executing instructions. Although the processor is bypassed for certain functions, e.g., when the input register is disabled to prevent input data from reaching the processor, the processor continues to process commands in the system with respect to all the functions sent through the other functional elements that remain operational, e.g., the IPC interface delivers data to/from other processor subsystems. The processor unit does not become disabled whenever a functional element in the I/O unit becomes disabled. However, the processor unit can be essentially disabled by disabling all the I/O elements to isolate the processor.

Selectively disabling individual functional elements in the I/O unit is particularly advantageous in a parallel processing computer system such as the Sarnoff Engine. The processor can be placed in a bypassed mode for certain functions while remaining in an active mode for other functions. For example, the processor subsystem may be placed in a fault-tolerant bypass mode whenever errors exist in the I/O unit's circuitry and/or processing unit's circuitry. In the fault tolerant bypassed processor subsystem, the I/O circuit isolates its associated processor from the system by disabling particular functional elements such as the input register and IPC interface.

Another feature of the present invention is that the processor continues to function with the remaining functional elements of the I/O unit while other functional elements are disabled. As such, each processor subsystem in the array of processor subsystems can be selectively placed in a fault tolerant bypass state. The functional segmentation of the I/O unit provides a mechanism to control the stream of electronic data to and from the associated processor unit.

For example, one function of this invention is efficient distribution of input data for subsequent storage to hard disk drive 206. To store data into the hard disk drive 206, a stream of data is coupled from the input board 122 of FIG. 1 to the I/O unit. In a typical storage scenario, when the invention is implemented in a video signal processing system, the first pixel of input data is stored into the disk 206 associated with the processor 220 within the first processor subsystem $110_1$ in the array of processor subsystems $110_1$–$110_n$. Similarly, the second pixel of input data is stored into the disk associated with second processing unit. This pattern is continued until the number of available disk drives, n, with the nth input pixel stored in the disk drive associated with the nth processing unit, is exhausted. After n pixels of data have been input to n processing units, the n+1st pixel will be stored in the disk drive 206 associated with the first processing unit. Thus, the input data will be assigned (striped) to the processing units in modulo.

To promote fault tolerancy in the event of a disk failure, a robust error protection scheme is applied across the array of disk drives. Those skilled in the art commonly refer to such methods of protection as Redundant Array of Inexpensive Disks (RAID) protection. Typically, parity protection of the data stored on the array of hard disk drives 206 is achieved by computing the bitwise parity of the words of data being stored to a number of disks, e.g., RAID 5. The parity word is stored on a selected disk in the hard disk drive array.

For example, a typical RAID 4 error protection scheme has four words of data stored on four consecutive hard disk drives. A bit-wise exclusive-OR (XOR) is performed on the four data words and the resulting word is a parity word that is stored on the fifth disk. In the event that one disk in the parity group is unable to provide correct data, the protection scheme is sufficient to provide robust error protection, or error recovery, if the point of error is known.

With traditional systems using processor arrays, the order of resulting input data words and parity words is not optimal. Specifically, after processing units 1–4 store input data in their associated disk drives, and processing unit 5 stores parity data on its associated disk drive, the input data previously stored in processing unit 5 must be transferred to processing unit 6. Thus, all the input data must be shifted to provide disk space for parity data on every fifth disk drive associated with every fifth processor subsystem in the array of subsystem processors. The transfer of data involved in applying a RAID error protection scheme demands intense interprocessor communication. The resulting pattern of data communication from one processor to another for storage information is inefficient and time-consuming because the interprocessor communication involved does not readily map to an efficient parallel implementation. In contrast, when the invention is applied, i.e., an element of the I/O unit associated with every fifth processing unit is disabled while the input data is propagated through the system, the storage of input data with a robust error protection scheme is direct. When the input register associated with every fifth processing unit is disabled, the input data propagates to the appropriate processing units which store the input data word in the proper hard disk drive. Since every fifth processing unit is bypassed with respect to the input data transfers, they remain operational for computing parity and storing it to disk. Specifically, every fifth processor subsystem has a disabled input register but an active IPC interface. This configuration allows the processor unit to communicate with the previous four processor subsystems and compute parity and save the parity word in its associated hard disk drive.

Additionally, the invention has been discussed as implemented in a parallel processing computer system; however, the invention should not be construed as being limited to that particular application. The processor subsystem of FIG. 2 could also be a portion of a stand-alone, single processor work station or personal computer. Such a single processor system could benefit from a segmented I/O circuit that is connected to various data sources, data sinks and/or network assets. In the case of a single processor computer system, the controller would be replaced with a instruction sequencer.

Although various embodiments which incorporate the teachings of the present invention have been shown and described in detail herein, those skilled in the art can readily devise many other varied embodiments that still incorporate those teachings.

What is claimed is:

1. In a computer system containing at least one processor subsystem, apparatus, for selectively disabling certain elements of said processor subsystems, comprising:
    a processor unit;
    an input/output unit, connected to said processor unit, being partitioned into a plurality of functional elements; and
    a functional element controller connected to each functional element, for selectively disabling said functional elements.

2. The apparatus of claim 1 wherein said functional element controller further comprises an instruction decoder, coupled to said processor unit and a processor subsystem controller, for decoding instructions that identify a particular functional element to disable.

3. The apparatus of claim 1 wherein the functional elements of said input/output unit comprises:
    an input register, connected to said processor unit and connected to at least one other processor subsystem; and
    an output register, connected to said processor unit and connected to at least one other processor subsystem.

4. The apparatus of claim 1 wherein the functional elements of said input/output unit further comprises:
    an interprocessor communications interface, connected to said processor unit and connected to at least one other processor subsystem, for enabling each of said processor units in each of said processor subsystems to communicate to one another.

5. The apparatus of claim 4 wherein the functional elements of said input/output unit further comprises:
    a storage device interface, connected to said interprocessor communications interface and to an information storage device, for coupling the processor with said information storage device.

6. The apparatus of claim 5 wherein said information storage device is an array of hard disk drives wherein each said disk drive in said array of hard disk drives is connected to each said storage device interface.

7. The apparatus of claim 5 wherein the said information storage device is an array of hard disk drives wherein each said hard disk drive is connected in a shared disk configuration to one or more said storage device interface.

8. A parallel processing computer comprising:
    at least one controller; and
    a plurality of processor subsystems each comprising:
        a processor unit;
        an input/output unit, connected to said processor unit, being partitioned into a plurality of functional elements; and
        a functional element controller, connected to each functional element in said plurality of functional elements, for selectively disabling said functional elements.

9. The apparatus of claim 8 wherein said functional element controller further comprises an instruction decoder, coupled to said processor unit and a processor subsystem controller, for decoding instructions that identify a particular functional element to disable.

10. The apparatus of claim 8 wherein the functional elements of said input/output unit comprises:
    an input register, connected to said processor unit and connected to at least one other processor subsystem; and
    an output register, connected to said processor unit and connected to at least one other processor subsystem.

11. The apparatus of claim 10 wherein the functional elements of said input/output unit further comprises:
    an interprocessor communications interface, connected to said processor unit and connected to at least one other processor subsystem, for enabling each of said processor units in each of said processor subsystems to communicate to one another.

12. The apparatus of claim 11 wherein the functional elements of said input/output unit further comprises:
    a storage device interface, connected to said interprocessor communications interface and to an information storage device, for coupling the processor with said information storage device.

13. The apparatus of claim 12 wherein said information storage device is an array of hard disk drives wherein each said disk drive in said array of hard disk drives is connected to each said storage device interface.

14. The apparatus of claim 12 wherein the said information storage device is an array of hard disk drives wherein each said hard disk drive is connected in a shared disk configuration to one or more said storage device interface.

15. In a parallel processing computer containing a plurality of interconnected processor subsystems, where each processor subsystem contains a processor unit, an input/output unit partitioned into functional elements, a method for selectively disabling said functional elements, comprising the steps of:

selecting at least one of said processor subsystems containing functional elements to be bypassed;

choosing at least one of said functional elements;

disabling said chosen functional element; and operating said functional elements that were not chosen.

16. The method of claim 15 wherein said functional element comprises an input register.

17. The method of claim 15 wherein said functional element comprises an output register.

18. The method of claim 15 wherein said functional element comprises an interprocessor communications interface.

19. The method of claim 15 wherein said choosing step further comprises the step of choosing a storage device interface as a disabled functional element.

* * * * *